O. O. MARTIN.
COMPUTING MECHANISM.
APPLICATION FILED FEB. 24, 1910.

1,234,368.

Patented July 24, 1917.
6 SHEETS—SHEET 4.

WITNESSES

INVENTOR,
Olaf O. Martin.
by L. Julihn
Attorney

O. O. MARTIN.
COMPUTING MECHANISM.
APPLICATION FILED FEB. 24, 1910.

1,234,368.

Patented July 24, 1917.
6 SHEETS—SHEET 5.

WITNESSES

INVENTOR,
Olaf O. Martin.
by _____ Attorney

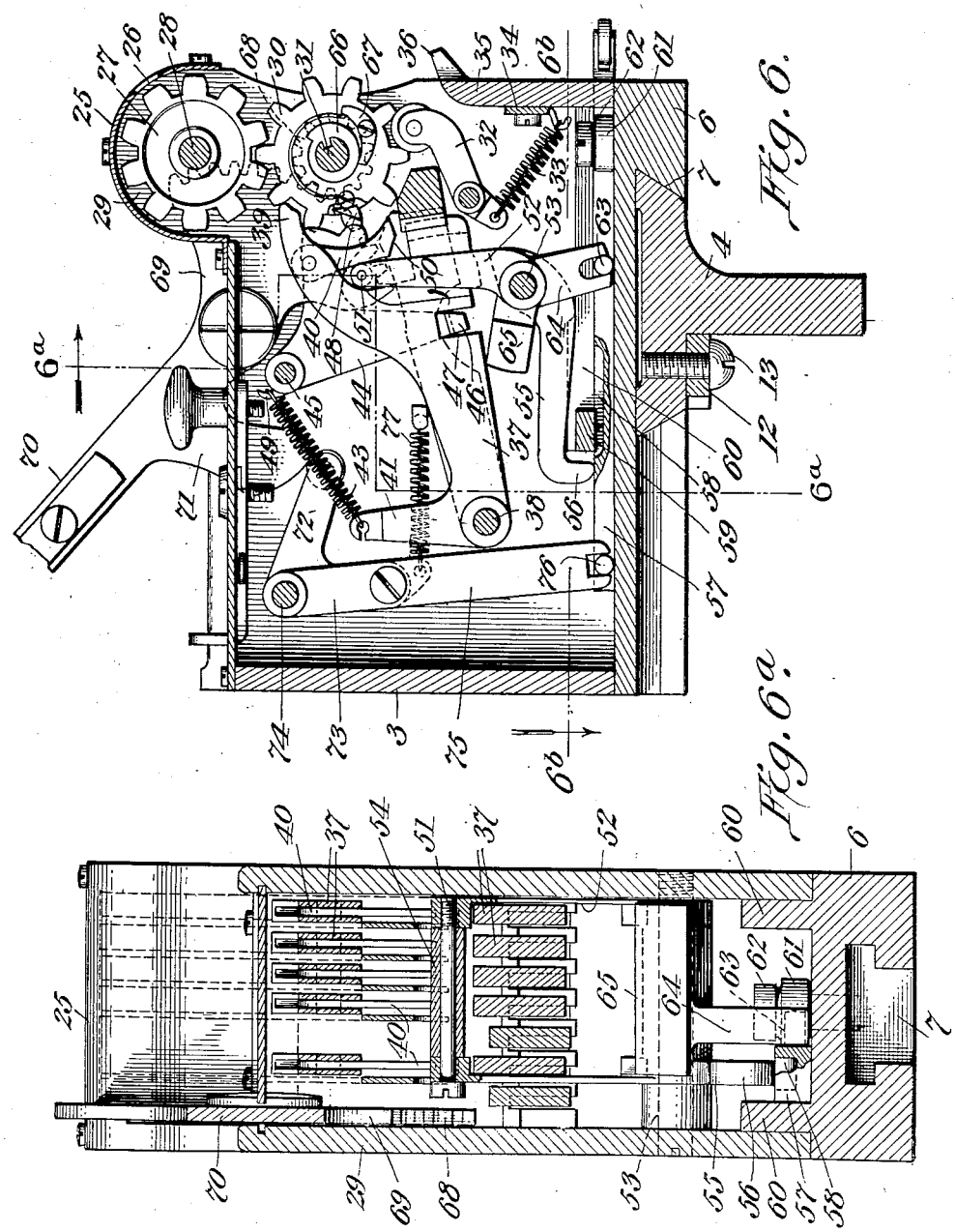

UNITED STATES PATENT OFFICE.

OLAF O. MARTIN, OF PORTLAND, OREGON, ASSIGNOR TO ELLIOTT-FISHER COMPANY, OF HARRISBURG, PENNSYLVANIA, A CORPORATION OF DELAWARE.

COMPUTING MECHANISM.

1,234,368.    Specification of Letters Patent.    Patented July 24, 1917.

Application filed February 24, 1910. Serial No. 545,607.

*To all whom it may concern:*

Be it known that I, OLAF O. MARTIN, a citizen of the United States of America, residing at Portland, in the county of Multnomah and State of Oregon, have invented certain new and useful Improvements in Computing Mechanism, of which the following is a specification.

My present invention relates to computing mechanism, and more particularly to what is known as the register or totalizer of a writing-adding machine wherein the operation of the register is controlled from the writing mechanism and serves to totalize a column of numbers as the latter are written upon a work sheet.

The object of the invention, stated generally, is to simplify the construction of the register and to render the operation of the same more certain and positive to the end that the possibility of error in the computation effected may be eliminated.

Considered more specifically one object of the invention is to reduce the number of parts by equipping the selective and carrying mechanisms with operating springs common to both.

Another object is to provide means whereby the carrying dogs will be positively moved into engagement with the wheels by the operation of the carrying mechanism, instead of requiring independently operating dog locating mechanism, and whereby the dogs will be retained in their engaging positions during the entire carrying operation.

Another object is to so arrange the dog locating mechanism that while the location of the dogs with relation to the wheels is effected by the operation of the carrying mechanism, said dogs will nevertheless be allowed to move back out of engagement with the wheels whenever the carrying mechanism is retracted.

A further object is to simplify and improve the resetting mechanism for the carrying devices and to provide improved means for adjustably securing the register in proper position to totalize a column located at any desired point on the work sheet. The means whereby these and other objects of the invention are attained will be clearly understood as the succeeding description is developed.

In the accompanying drawings—

Figure 1 is a longitudinal sectional view through the register with the parts thereof occupying their normal positions.

Fig. 1ª is a detail perspective view of a portion of the bottom wall of the register casing.

Fig. 1ᵇ is a bottom plan view of the register lock.

Fig. 2 is a view similar to Fig. 1, but showing a selector moved back to permit one of the carrying devices to operate.

Fig. 2ª is a detail view of the dog locating yoke.

Fig. 2ᵇ is a similar view of the reset rocker.

Fig. 2ᶜ is a detail perspective view of the reset crank and slide.

Fig. 3 is a view similar to Figs. 1 and 2, but showing the positions assumed by the parts after the carrying mechanism has operated.

Fig. 3ª is a transverse sectional view on the line 3ª 3ª of Fig. 3.

Figure 6B:
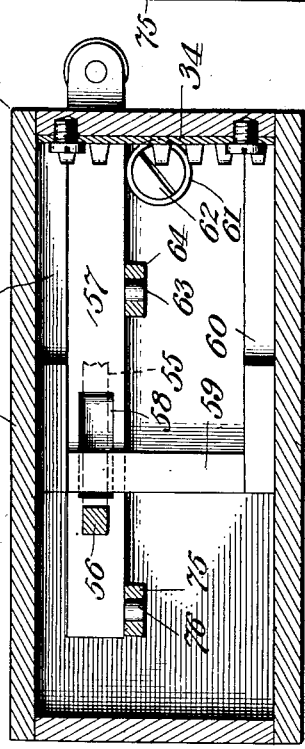
Fig. 6 is still another sectional view of the register showing the resetting lever during the retraction thereof in the act of resetting the carrying devices after the latter have been thrown down as an incident to the operation of resetting the wheels.

Fig. 6ª is a transverse section on the line 6ª 6ª of Fig. 6.

Fig. 6ᵇ is a horizontal section on the line 6ᵇ 6ᵇ of Fig. 6.

It may be stated by way of premise that the writing-adding machine to the improvement of which the present invention is more particularly directed is a combined typewriting and adding machine known to commerce as the Elliott-Fisher and fully disclosed in Patent No. 829,971 to Charles F. Laganke and John A. Smith, although it is obvious that the herein described register construction is useful in other relations.

The Elliott-Fisher writing-adding machine is a flat platen typewriter including traveling printing mechanism operated by keys which also operate an actuator or master wheel. This master wheel coacts with a register or totalizer mounted on the frame of the typewriter in rear of the carriage. The register includes a series of denominational members in the form of wheels. These members or wheels are engaged successively by the master wheel or actuator as the printing mechanism moves across the column to successive denominational positions. Whenever a number is printed in any denominational position on the work sheet the number wheel of the register occupying a corresponding denominational position will be rotated a number of units or increments corresponding to the value of the printed digits. The register also includes carrying mechanism whereby the value accumulated in any denominational order is transferred to the next higher order when the limit of the order is reached. It will thus be seen that as a column of numbers is written on the work sheet by the typewriter the values represented by such numbers will be added by the register and the total exhibited. Since the machine thus briefly described is well known further description thereof appears to be unnecessary for the purpose of this disclosure.

In the drawings 1 indicates a portion of the typewriter carriage and 2 a portion of the master wheel or actuator. In rear of the carriage 1 is mounted the register 3 adjustable on the register bar 4 which is secured to the frame of the typewriter. The register includes a casing 5 the bottom wall 6 of which is formed with a transverse dovetail channel or way 7 for the reception of the correspondingly shaped register bar 4. Extending rearwardly from the channel or way 7 is a guideway 8 for the reception of a longitudinally flanged locking slide 9 to the under side of which is secured a plate 10 the front end of which is formed with teeth 11 arranged to engage the interdental spaces of a rack bar 12 adjustably secured to the under side of the register bar 4 as by screws 13. The rear end of the plate 10 is formed with a handle or finger piece 14 by means of which the slide may be moved longitudinally to effect the engagement and disengagement of the locking slide and rack. While the plate 10 may be made integral with the slide, it is secured thereto in the present instance by screws 15 one of which is extended into a longitudinal slot 16 in the wall 5 and serves as a limiting stop for the slide.

The manner in which the adjustment of the rack 12 is secured is not material, the expedient here shown consisting in slotting the rack, as indicated at 17, for the accommodation of the securing screws 13 which, when the rack has been properly adjusted are screwed securely in place, the heads thereof impinging against the under side of the rack.

For the purpose of securely retaining the locking slide in engagement with the rack, I provide securing means in the form of a yoke 18 the side arms of which are pivotally connected to the sides of the bottom plate 5 by bearing screws 19, the plate 5 being preferably recessed, as indicated at 20, to accommodate this yoke. Through the crossbar of the yoke 18 is passed a headed thrust screw 21 having a nut 22 secured to its inner end and adapted to bear against the outer end of the slide 9. The inner ends 23 of the yoke 18 are extended sufficiently beyond the axis of movement thereof to constitute stops engaging the bottom of the recess 8 to prevent the yoke from swinging down beyond a position in line with the slide. When it is desired to remove the yoke from interfering relation with the slide the former may be swung up, its side arms being recessed, as indicated at 24, to accommodate the adjacent corner of the register casing. It may be remarked in passing that the thrust screw 21 is not absolutely necessary to the operativeness of the structure, since a slide and yoke of proper dimensions would coact to produce an absolutely secure lock for the register. By providing the screw, however, wear may be compensated for and in addition the slide may be forced to its engaging position under pressure.

At the upper front corner of the register casing is formed a hood 25 having a sight opening 26 through which is visible the number registered by a series of registering wheels 27 mounted on the shaft 28 extending between the side walls 29 of the casing. The wheels 27 are toothed and have the numerals 0 to 9 displayed on their peripheries so that as a given wheel is rotated the digits thereon will be successively displayed at the opening 26. Meshing with the wheels 27 is a subjacent series of number wheels or denominational members 30 toothed to engage the registering wheels 27 and the master actuator 2. The master wheel or actuator 2 is moved into engagement with successive wheels 30 by the advance of the typewriter carriage 1 as heretofore intimated. The wheels 30 are yieldingly retained by wheel locators 32 urged toward the wheels by springs 33 secured to a hook plate 34 secured to the front wall 35 of the register casing.

Figure 1:
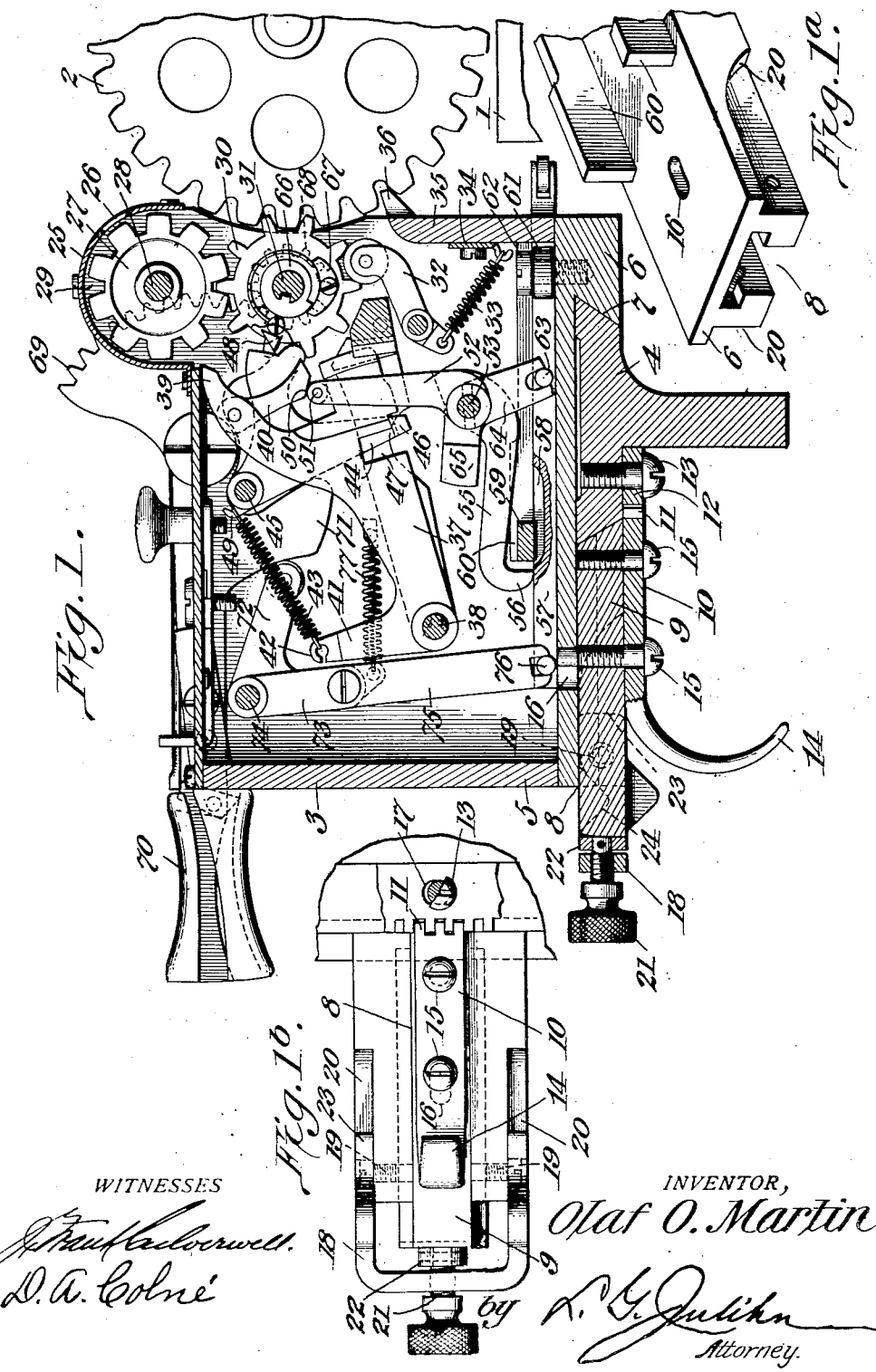

At the upper edge of the plate 35 are formed integral forwardly extending lugs 36 which engage the interdental spaces of the master wheel and serve to properly locate the latter and to prevent its rotation at certain periods in its traverse across the register. The carrying mechanism, whereby, upon the completion of a cycle of movement by each number wheel, the adjacent number wheel of higher order is advanced a single increment, includes a series of carrying levers 37 mounted on a shaft 38 extending across the casing. The levers 37 are formed at their front ends with locking portions 39 in rear of which are loosely mounted pendent carrying dogs 40 normally occupying positions in rear of and out of engagement with the wheels 30. The carrying levers 37 are also provided with upstanding tail pieces 41 terminating in hooks 42 for the attachment of motor springs 43 which serve, when permitted, to throw down the front ends of the carrying levers 37 for the purpose of causing the dogs 40 to operate the wheels 30. Normally, however, the levers 37 are retained in elevated positions, as shown in Fig. 1, by a series of triangular plates, latches or selectors 44 swung from a transverse shaft 45 and alternating with the levers 37. The lower ends of the selectors are bent laterally, as indicated at 46, to engage under the levers 37, but when the selectors are thrown back, the retaining ends 46 thereof come opposite recesses 47 in the levers 37 and permit the latter to drop from the position shown in Fig. 1 to that shown in Fig. 3 of the drawings. The selectors or latches 44 are operated by the wheels 30.

Figure 2:
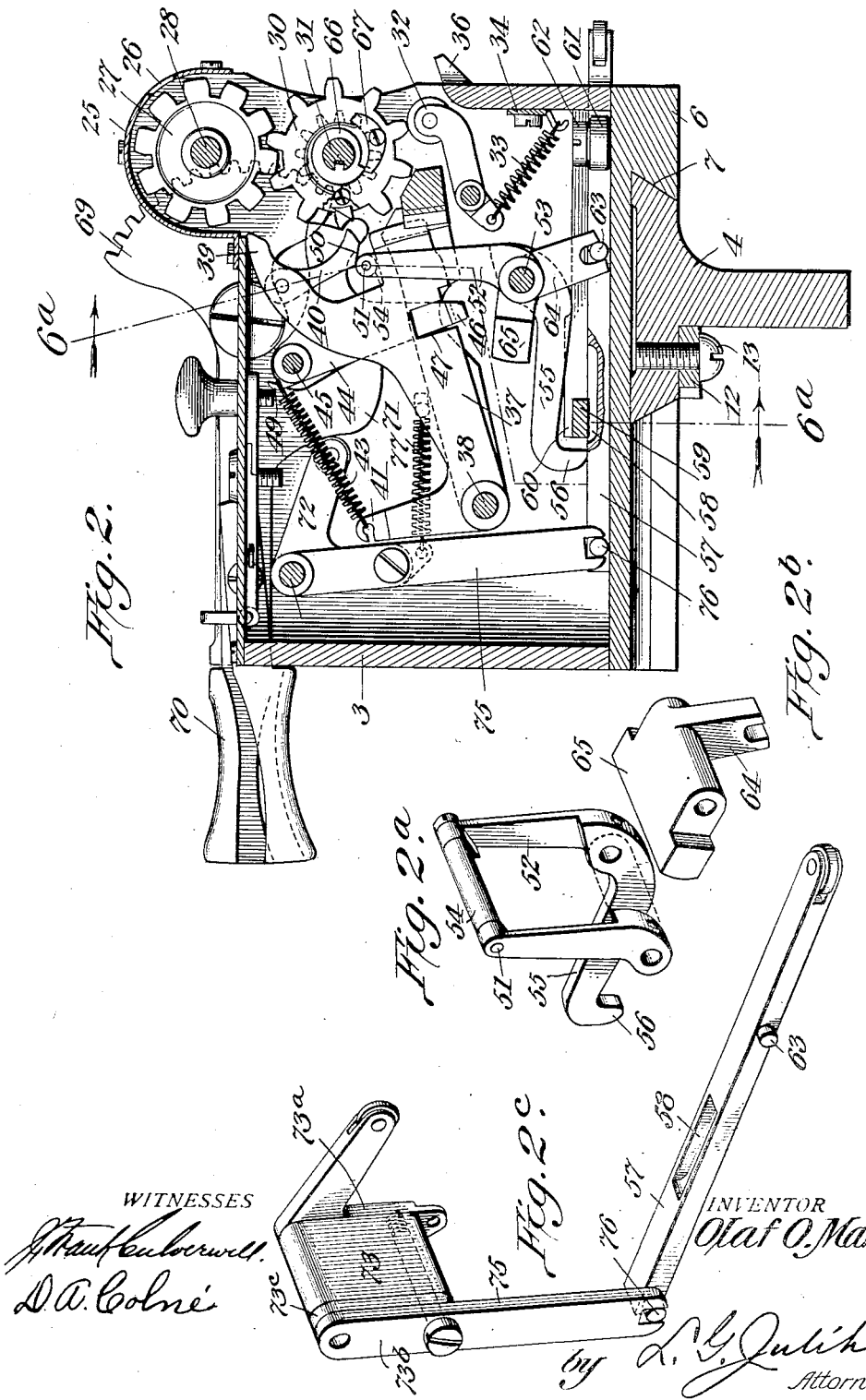

The front end of each selector 44 is extended between a pair of wheels 30, the left hand wheel being equipped with a carrying lug 48 which, as the wheel moves from 0 to 9, engages the selector and moves the latter back, as shown in Fig. 2, so that said selector will release its carrying lever and permit the latter to effect the advance of the number wheel of next higher order than the wheel which operated the selector.

The described movement of the selectors 44 is effected in opposition to the springs 43, attention being particularly directed to the fact that these springs are secured at their front ends to hooks 49 extended from the selectors above but adjacent to the axis of movement thereof. The described arrangement serves to make the springs 43 common to both the carrying levers and selectors. This economical and exceedingly advantageous arrangement is made possible notwithstanding the fact that the springs 43 are required to exert more or less force for the operation of the carrying levers and are not designed to exert more than sufficient force upon the selectors 44 to return them to normal position. These conditions are answered by the securing of the springs 43 at some distance from the axis of the carrying levers 37 to obtain considerable leverage, and very close to the axis of the selectors 44 to reduce the leverage sufficiently to prevent the springs from opposing any undue resistance to the movement of the selectors by the wheels 30. For the sake of definition the springs 43 may be said to constitute carrying motors for the levers 37 and retracting means for the selectors 44 since they impart operative movement to the carrying levers but serve merely to retract the selectors to normal position.

It has been stated heretofore that the carrying dogs 40 are normally out of engagement with the wheels 30 but engage and advance the latter when the levers 37 are swung down. Several forms of mechanism have heretofore been devised for effecting the engagement of the dogs with the wheels. For instance, the dogs have been urged toward the wheels by springs, (see Patent No. 825,469 to Laganke and Smith), but this mode is not only unreliable but as the dogs are urged toward the wheels during the retraction of the levers 37 as well as during their operative movement there is a tendency to rotate the wheels 30 in the reverse direction whenever the carrying mechanism is reset. Another form of dog locating mechanism heretofore employed (see same patent) contemplates the elimination of the springs and the substitution of positively operated dog locators mounted within the register casing and extended in front thereof for engagement with an operating device mounted on the typewriter carriage. This arrangement while more reliable than the springs is open to the objection that the coacting parts on the register and carriage respectively must be carefully adjusted in order to insure their proper coaction and furthermore the resetting of the carrying mechanism with the carriage located in certain positions is impossible because of the fact that the dogs are held positively in their forward or engaging positions as long as the part on the typewriter carriage is in coacting relation with the locators.

One of the objects of the present invention is to provide the register with positive dog locating means which, while leaving the dogs 40 disengaged from the wheels 30 both normally and during the retraction of the carrying mechanism, will operate positively and independently of the typewriter carriage, or a part carried thereby, to move the dogs into engagement with the wheels whenever the carrying mechanism comes into action. To this end the dogs 40 are formed at their lower ends with cam faces 50 normally located above and in coacting relation with a normally stationary transverse member 51 constituting an element of a dog locating yoke 52 mounted on a transverse shaft 53. To reduce the friction the transverse member 51 of the yoke is preferably provided with a roller 54 with which the dogs 40 directly engage. Normally the dogs 40 occupy the positions shown in Fig. 1 and are entirely out of engagement with the wheels 30. As soon, however, as a selector 44 is thrown back, as indicated in Fig. 2, the carrying lever 37 controlled by said selector will be thrown down to the position indicated in Fig. 3. The first part of this movement will cause the carrying dog 40 carried by the lever to be cammed into engagement with a tooth of the adjacent wheel 30 by reason of a coaction between the cam face 50 of the dog and the transverse member 51 of the yoke 52. This forward or engaging movement of the dog will take place during the initial movement of the lever 37 and continued movement of the lever will therefore effect the advance of the wheel 30 a single increment or unit of movement. It will be noted, however, that if the yoke 52 retained its normal position during the elevation or retraction of the carrying lever 37 the dog would be held in engagement with the wheel during such retraction and thus cause the wheel to be moved backward. Therefore, provision is made for moving the yoke 52 for the purpose of withdrawing the transverse dog-locating member 51 thereof rearwardly preparatory to the resetting of the carrying mechanism so that the dogs 40, when moved up with the levers 37, may be swung back out of engagement with the wheels 30. To secure this operation of the yoke 52 one of the side members thereof is provided with an arm 55 having a downturned extremity 56 which normally rests upon the upper surface of a reset slide 57 supported by the bottom wall of the register casing and projected through the front wall thereof for coaction with the usual resetting cam movable with the carriage 1.

Figure 4:
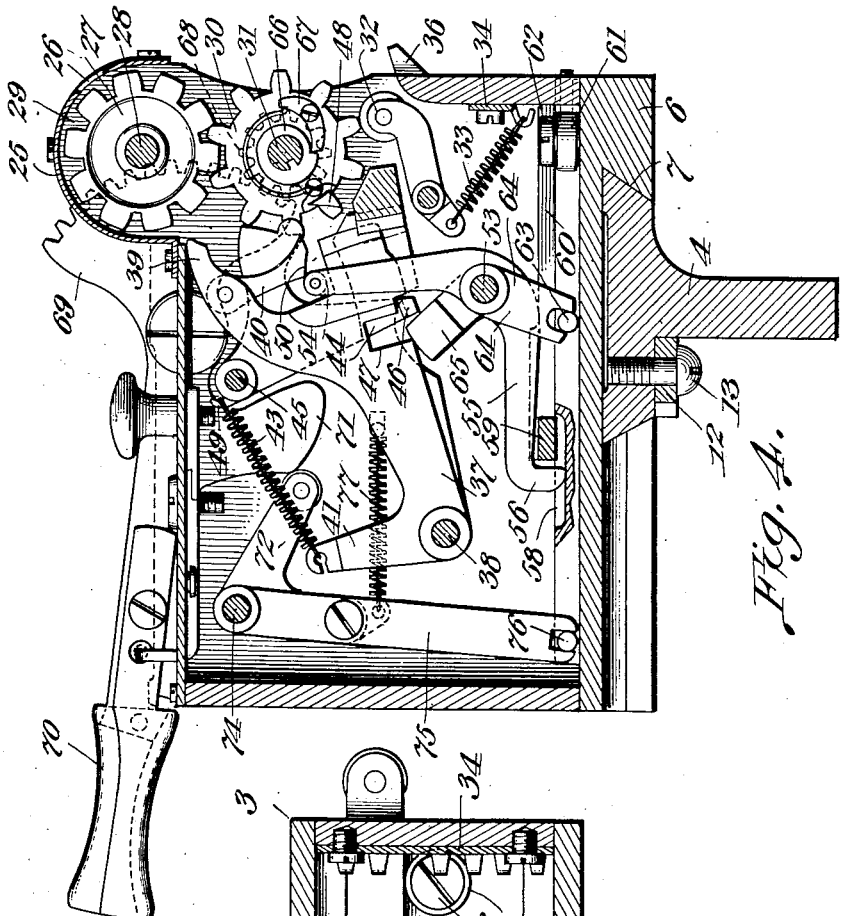
Fig. 4 is still another sectional view of the register showing the positions assumed by the parts when the carrying devices are first thrown up or reset preliminary to the resetting of the wheels.

In the upper surface of the slide 57 is formed a depression 58 normally occupying a position in advance of the end of the arm 55 but adapted to receive said arm when the slide is moved back from the position shown in Fig. 1 to that shown in Fig. 4. The slide 57 is prevented from rising by a transverse bar 59 extending between a pair of side flanges 60 upstanding from the bottom wall 6 of the register casing and serving as seat flanges for the side walls 29. The slide 57 is disposed against the inner face of one of these flanges 60 and bears at its opposite side against an anti-friction thrust-roller 61 mounted on a screw 62 secured in the wall 6. The roller 61 is located adjacent to the front end of the register casing and takes the side thrust of the slide 57 when the front end of the latter is engaged by the reset cam during the retraction of the carriage 1.

In addition to the recess or depression 58 the slide 57 is provided with a lateral lug or pin 63 engaging the forward extremity of an arm 64 of a reset rocker 65 mounted on the shaft 53 between the side arms of the yoke 52 and adapted to be operated by the slide 57 to reset the carrying mechanism. The mounting of the yoke 52 and the rocker 65 is clearly shown in Fig. 1 of the drawings and these elements are shown in detail in Figs. 2ª and 2ᵇ.

Figure 3:
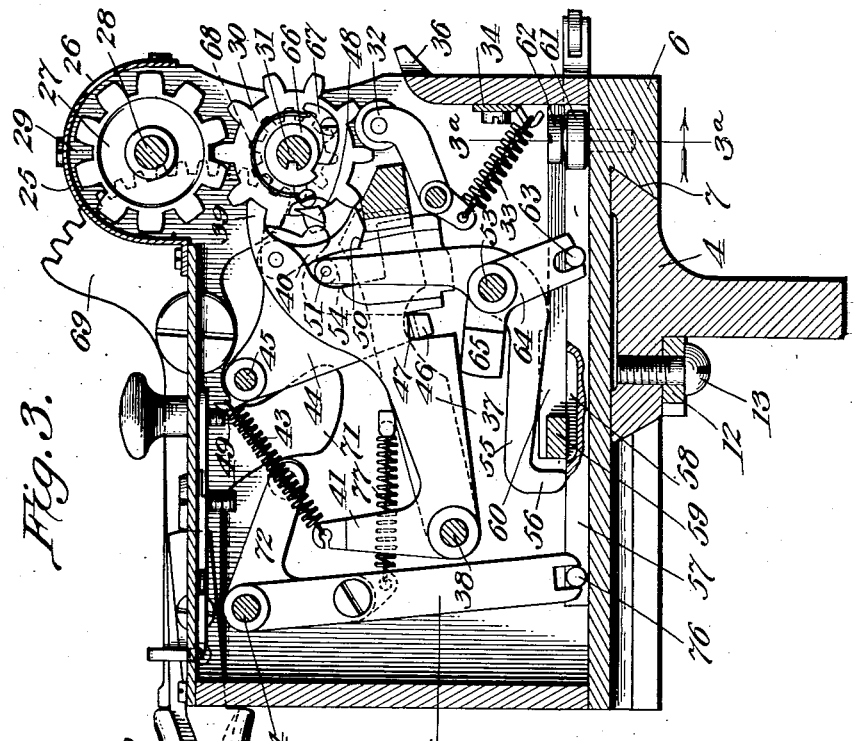

Assuming the parts to be in the positions indicated in Fig. 3, the resetting of the carrying mechanism is effected by the rearward movement of the slide 57. The initial rearward movement of the slide permits the arm 55 to drop into the recess 58 and swings the rocker 65 into engagement with the carrying levers 37. This permits the locking yoke 52 to rock back away from the carrying dogs 40 so that the latter will not reverse or rotate the wheels 30 as the dogs rise with the carrying levers 37 as the latter are elevated by the rocker 65 during continued rearward movement of the slide 57, see Fig. 4. The reset rocker 65 not only elevates the carrying levers 37 to normal position, but also engages and restores the selectors 44 to guard against any possible failure of the springs 43 to properly reset the selectors. When the slide 57 again moves forward, the arm 55 of the locating yoke is cammed out of the recess 58 and the yoke is thus presented in normal position to properly locate the dogs 40 when the carrying mechanism is again operated.

The mechanism whereby the wheels are reset to zero after a column has been added is in most respects ordinary. The shaft 31 is equipped with resetting cams 66 designed to engage reset pawls 67 carried by the wheels 30. At one end of the shaft 31 is secured a pinion 68 engaged by a toothed segment 69 formed at the rear end of a resetting lever 70 fulcrumed at one side of the casing. The resetting lever 70 is provided with a cam 71 engaging one arm 72 of what is known as the resetting crank 73 swung from a transverse shaft 74 and having its other or long arm 75 forked to engage a projection or pin 76 at the rear end of the slide 57.

The specific construction of the resetting crank 73 is one of the features of this invention. It includes two side members 73ª and 73ᵇ, the former being in the form of a bell crank lever one arm of which forms the short arm 72 of the crank. The other arm of the side member 73ª affords a means of attaching a retracting spring 77 secured at its front end to a fixed part. The member 73ᵇ is merely a flat strip of metal which forms the long arm 75 of the crank. The members 73ª and 73ᵇ are spaced apart by one or more spacing members 73ᶜ retained in place by a pin 73ᵈ passed through the members and spacing means respectively, as shown in Fig. 2ᶜ. The shaft 74 serves as additional means for securing these elements of the crank since it passes through both side members and the spacing devices 73ᶜ. In order that the utility of this construction may appear it may be stated that since the member 73ª of the resetting crank coacts with the resetting lever it lies closely adjacent to one side of the casing and this may be either side, since in some forms of registers the resetting lever is located at one side and in others at the opposite side. The resetting slide 57 is not located immediately adjacent to either side of the casing, but is disposed at an intermediate point and therefore as the registers vary in width and as the location of the resetting slide is usually uniform with respect to one side or the other of the casing, it is necessary to provide for readily changing the lateral dimensions of the resetting crank to accommodate the latter to the particular register under consideration.

It will be readily observed by reference to Fig. 2ᶜ that the member 73ª of the crank may be placed either at the right hand or left hand side of the member 73ᵇ and the distance between the members may be increased or decreased by increasing or decreasing the number of spacing members 73ᶜ employed. In this way stock parts may be made to accommodate themselves to registers of all widths and also registers having the resetting lever located at either the right or left hand side.

The operation of the described mechanism may be stated briefly as follows:

As a number is printed by the depression of the typewriter keys in the usual manner, the master wheel 2 will rotate the number wheels 30 and the number will be exhibited by the registering wheels 27 at the sight opening 26. As the next number is printed the register will be again operated and the registering wheels will exhibit the total of the numbers written. When any one of the registering wheels 27 reaches the limit of the denomination which it represents, as for instance when it moves from 9 to 0, the carrying lug 48 of the associated number wheel 30 will engage the adjacent selector 44 and swing the latter back to the position indicated in Fig. 2. This will release the carrying lever 37 of the next higher number wheel 30 and permit the former to drop to the position shown in Fig. 3. The dropping of the carrying lever will cause the carrying dog thereof to ride down past the transverse bar 51 of the locating yoke 52 which bar will cause the dog to be swung forward or cammed into engagement with a tooth of the wheel 30 and insure the carrying or advance of the latter by the continued downward movement of the dog.

When the carriage is retracted after a number has been written the reset slide 57 is moved back in a manner well understood in the art, thus swinging the reset rocker 65 and permitting the arm 55 of the locating yoke 52 to drop into the recess 58. Continued movement of the slide 57 will cause the rocker 65 to restore the carrying mechanism to normal position. The dogs 40, however, of the carrying levers instead of being held in their forward positions, are allowed to rise while out of contact with the wheels 30 because as soon as the arm 55 of the locating yoke 52 drops into the recess 58 the yoke is swung back sufficiently to allow the dogs 40 to swing out of the wheels. It may be remarked in passing that by reason of the described action of the dog locating yoke the mechanism may be said to include dog locating means serving upon the operation of the carrying mechanism to insure the positive engagement of the carrying dogs with the number wheels and automatically withdrawn from normal position to permit the disengagement of the wheels and dogs during the resetting of the carrying mechanism.

Figure 5:
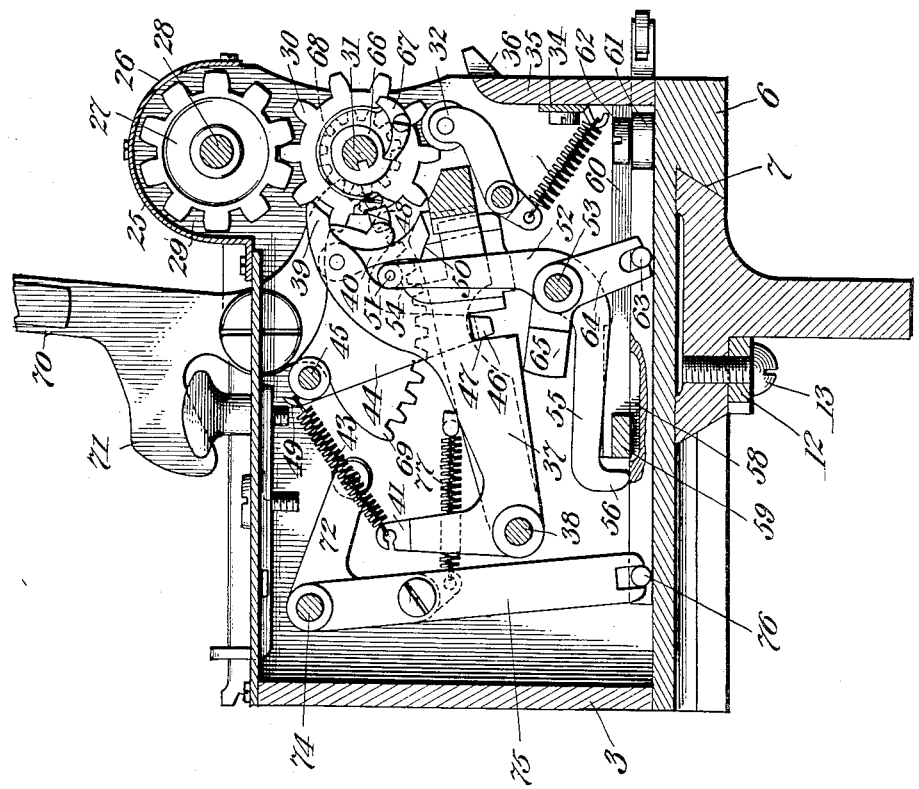
Fig. 5 is a similar view showing the parts in the positions they assume when the wheels have been completely reset.

After a computation has been completed, the register is reset to zero by the manipulation of the resetting lever 70. This is effected by elevating the rear end of the lever thus causing the toothed segment 69 thereof to rotate the pinion 68, the shaft 31, and the cams 66, the latter picking up the pawls 67 and rotating the wheels 30 to zero in a manner well understood in the art. It frequently happens, however, that when it is desired to reset the register one or more of the wheels 30 will be locked by the locking ends 39 of certain depressed or operated carrying levers 37, see for instance Fig. 3. It is therefore necessary to provide for the resetting of the carrying mechanism through the instrumentality of the lever 70. It is for this reason that the resetting crank 73 is connected to the slide 57 and arranged to be operated by the cam 71 of the lever 70. When the lever 70 is first moved, for instance to the position indicated in Fig. 4, the crank 73 will be swung to retract the slide 57 and thus cause the resetting of the carrying mechanism in a manner heretofore described in connection with the retraction of the slide by a cam movable with the carriage. Obviously the wheels 30 may begin to rotate as soon as the levers 37 begin to rise and when the lever 30 has reached its limit of movement, as shown in Fig. 5, the wheels will all have been set to zero and held locked by the levers 37, which obviously will have been operated in a manner heretofore described during the movement of the wheels 30 from 9 to 0. It is now merely necessary to return the lever 70 to normal position and incidental to this movement the cam 71 will again engage the resetting crank 73, as shown in Fig. 6, swinging the latter to operate the slide 58 and thus again reset the carrying mechanism, the cam 44 finally passing beyond the arm 72 of the crank 73 permitting the latter, the reset slide 77, the reset rocker 65 and the dog locating yoke 52, to resume their normal positions, as shown in Fig. 1.

It is thought that from the foregoing, the construction and arrangement of the register embodying my improvements will be clearly understood, but while the present embodiment of the invention appears at this time to be preferable, I wish to reserve the right to effect such variations of the illustrated structure as may come fairly within the scope of the protection prayed.

What I claim is:—

1. In a register, a plurality of denominational members and carrying mechanism, said carrying mechanism including a carrying device, a latch therefor, and motive means common to the carrying device and latch and acting to move the carrying device to carry.

2. In a register, a plurality of denominational members and carrying means including a carrying device, a latch controlling the operation thereof, and a motor spring connected to both the carrying device and latch and urging the carrying device to carry.

3. In a register, a plurality of denominational members and carrying mechanism including a carrying device, a latch, and a carrying motor arranged to operate the carrying device to carry and to retract the latch.

4. In a register, a plurality of denominational members, and carrying mechanism including a carrying device and a latch mounted to swing from separate axes, of a motor spring connected to both the carrying device and the latch but at different distances from their respective axes and serving to move the carrying device to effect the carrying operation.

5. In a register, a plurality of denominational members and carrying means, said carrying means including a carrying lever having an upstanding arm or tail piece, a latch swung from an axis above the lever and controlling the movement of the latter, the latch being in turn controlled by one of the denominational members, and a motor spring connected to the tail piece of the carrying device and also connected to the latch, the connection of the motor spring with the latch being comparatively near the axis of movement of the latter and the connection of the motor spring with the carrying lever being comparatively remote from the axis of said lever.

6. In a register, a plurality of denominational members, a carrying device normally disengaged from the members, means for imparting movement to the carrying device in the direction to impart the carrying movement to a denominational member, and means for moving the carrying device into engagement with the denominational member during the first part of the movement of said device in said carrying direction.

7. In a register, a plurality of denominational members, a carrying device normally disengaged therefrom, but having its carrying movement controlled by one of said members, and means operative during the carrying movement of the carrying device to cam the latter into engagement with one of the denominational members.

8. In a register, a plurality of denominational members, a carrying device controlled by one of said members, a locator normally located in the path of the carrying movement of the carrying device to cam the latter into engagement with a denominational member and to hold the same engaged during the remainder of the carrying movement, said locator being movable from its normal position to permit the carrying device to disengage the denominational member and remain disengaged during the retraction of said device.

9. In a register, a plurality of denominational members, a carrying device controlled by one member and adapted to engage the other, a locator for the carrying device, and resetting mechanism operative to reset the carrying device and controlling the position of the locator.

10. In a register, a plurality of denominational members, a carrying device controlled by one denominational member and arranged to engage and carry the other member, a locator normally disposed to insure the engagement of the carrying device with a denominational member, and resetting mechanism operative to cause the displacement of the locator from normal position and to reset the carrying device while the locator is displaced.

11. In a register, a plurality of denominational members, a carrying device controlled by one member and movable to advance or carry another member, a locator for the carrying device, and resetting mechanism for the carrying device, said resetting mechanism including a reset slide coacting with the locator.

12. In a register, a plurality of denominational members, a carrying lever having its movement controlled by one of the members, a carrying dog movable with the carrying lever, and also movable into and out of engagement with a denominational member, a dog locator coacting with the dog during movement of the carrying lever, and means operative to cause the withdrawal of the locator from normal position and to retract the carrying lever and dog.

13. In a register, a plurality of denominational members, an oscillatory carrying lever controlled by one member, a carrying dog movable with the carrying lever, and a locator located in the path of movement of the carrying dog to cam said dog into engagement with a denominational member as the carrying lever is moved.

14. In a register, a plurality of denominational members, a carrying lever having its carrying movement controlled by one of the denominational members, a dog movable with the lever, a locator arranged to cam the dog into engagement with a denominational member during the movement of the carrying lever, and means for causing the withdrawal of the locator from normal position to permit the disengagement of the dog from the denominational member after the latter has been carried.

15. In a register, a plurality of denominational members, a carrying lever controlled by one member, a carrying dog movable with the lever and arranged to engage and carry another denominational member, a locator disposed to coact with the carrying dog and mounted to swing from normal position, and resetting mechanism for the carrying lever, said resetting mechanism coacting with the locator to retain the same in normal position and movable to cause the locator to swing out of normal position and to reset the carrying lever.

16. In a register, a plurality of denominational members, a carrying lever controlled by one member and having a carrying dog arranged to coact with another member, a swinging locator for said dog, an arm extended from the locator, and mechanism including a reset slide operative to reset the carrying mechanism, said reset slide coacting with the arm of the locator and controlling the swinging of the locator into and out of normal position.

17. In a register, a plurality of denominational members, a carrying lever controlled by one member, a dog movable with said lever and disposed to engage and operate another member, a dog locator arranged to coact with the dog to cam the latter toward the member to be engaged thereby, said locator having an arm or tail piece, a shaft supporting the locator, a reset rocker mounted on the shaft and coacting with the carrying lever to restore the same to normal position, and a reset slide arranged to operate the reset rocker and coacting with the arm or tail piece of the locator.

18. In a register, a series of denominational members, a series of carrying devices therefor, and a locator common to all of the carrying devices and coacting with the same during the carrying movement to cam said devices into engagement with the denominational members.

19. In a register, a series of denominational members, a series of carrying devices controlled thereby and normally out of engagement therewith, a normally stationary locating yoke coacting with the carrying devices during the carrying movement of the latter, and resetting means operative to reset the carrying devices and to cause the displacement of the locating yoke from normal position during the resetting operation.

20. The combination with a series of denominational members, of a series of carrying levers, carrying dogs movable with the levers, and a normally stationary dog locating yoke arranged to cam the dogs into engagement with the denominational members during the carrying movement of the levers.

21. The combination with a series of denominational members, of a series of carrying levers controlled thereby, carrying dogs movable with the levers, a dog locating yoke common to all of the carrying dogs and arranged to cam the latter into engagement with the denominational members as the carrying levers begin their carrying movement, and resetting mechanism for the carrying levers, said resetting mechanism normally retaining the locating yoke but operative to cause the withdrawal of said yoke from its normal position.

22. The combination with a series of denominational members, a series of carrying levers controlled thereby, carrying dogs movable with the levers, a dog locating yoke coacting with the dogs and having an arm, and resetting mechanism including a slide coacting with the arm to control the position of the locator and a reset rocker operated by the slide.

23. A register including a series of denominational members, carrying mechanism and setting mechanism, said setting mechanism including an operating member located at one side of the register, an operated member located at a point removed from said side of the register, and an intermediate motion transmitting element comprising two side members and intermediate spacing means.

24. A register including a series of denominational members, carrying mechanism therefor and resetting mechanism, said resetting mechanism including a resetting lever mounted at one side of the register, a reset slide, and a reset crank coacting with the lever and slide and comprising separate side members and intermediate variable spacing means.

25. The combination with a register including a series of number wheels, of means for resetting the number wheels to zero, carrying means coöperating with the wheels, and means operated by the wheel resetting mechanism to reset the carrying mechanism, said means including a resetting crank comprising separate side members, intermediate spacing means, and means for connecting the side members and spacing means in a rigid organization.

26. The combination with a register and a register support, of a locking member carried by one of said elements and movable into and out of engagement with the other, and a retaining device movable into and out of the path of the locking member.

27. The combination with a register and its support, of locking means therefor including a movable locking member, a retaining member movable into and out of coacting relation with the locking member, and means carried by the retaining member for urging the locking member into close engagement with the support.

28. The combination with a register and its support, of locking means including a movable locking member, and a retaining member mounted to swing into and out of position to retain the locking member in position to lock the register on its support.

29. The combination with a register and its support, of means for locking the register to the support, said locking means including a locking slide, and a pivoted yoke movable into and out of position to obstruct the movement of the slide.

30. The combination with a register and its support, of locking means retaining the register on the support and including a locking slide, a pivoted yoke movable into and out of position to obstruct the movement of the slide, and an adjustable member carried by the yoke and coacting with the slide to insure the proper retention thereof.

31. The combination with a register and its support, of locking means retaining the register on the support and including a locking slide, a swinging yoke, and a screw carried by the yoke and coacting with the slide to insure a proper retention thereof.

32. The combination with a register support, a rack, of a register, a locking device carried thereby and movable into and out of engagement with the rack, and a member movable into and out of the path of said device and also adjustable relative thereto.

33. The combination with a register support, of a longitudinally adjustable rack carried thereby and disposed longitudinally of the support, a register mounted on the support and adjustable longitudinally thereof, a toothed locking slide carried by the register and movable into and out of engagement with the rack carried by the support, a swinging yoke carried by the register and movable into and out of the path of the slide, and an adjusting screw carried by the yoke and opposed to the slide.

34. The combination with a longitudinally stationary register support, of a register carried directly by said support, means for securing the register fixedly to the support, said means including coacting toothed members carried by the register and the register support respectively, one of said members being adjustable in a direction lengthwise of the register support, and means for securing said adjustable member in its adjusted positions.

35. The combination with a register support, of a register fixedly carried by the support and register securing means including a rack adjustably carried by the support, means for fixedly securing the rack in its adjusted positions relative to the support and a member carried by the register and engaging the rack.

36. The combination with a register support, of a register movable to different positions longitudinally of the support and means for rigidly securing the register to the support, said means including a toothed rack adjustable on the support, means for rigidly securing the rack to the support after its adjustment thereon and a toothed locking slide carried by the register and movable to engage the rack.

37. The combination with a register support, of a rack rigidly secured to but adjustable on the support, a register carried by the support, a locking member carried by the register and movable to engage the rack and a retaining device movable into position to retain the locking device, the rack and the support in a rigid assemblage.

In testimony whereof I affix my signature in presence of two witnesses.

OLAF O. MARTIN.

Witnesses:
T. J. GEISLER,
CECIL LONG.